Figure 1:
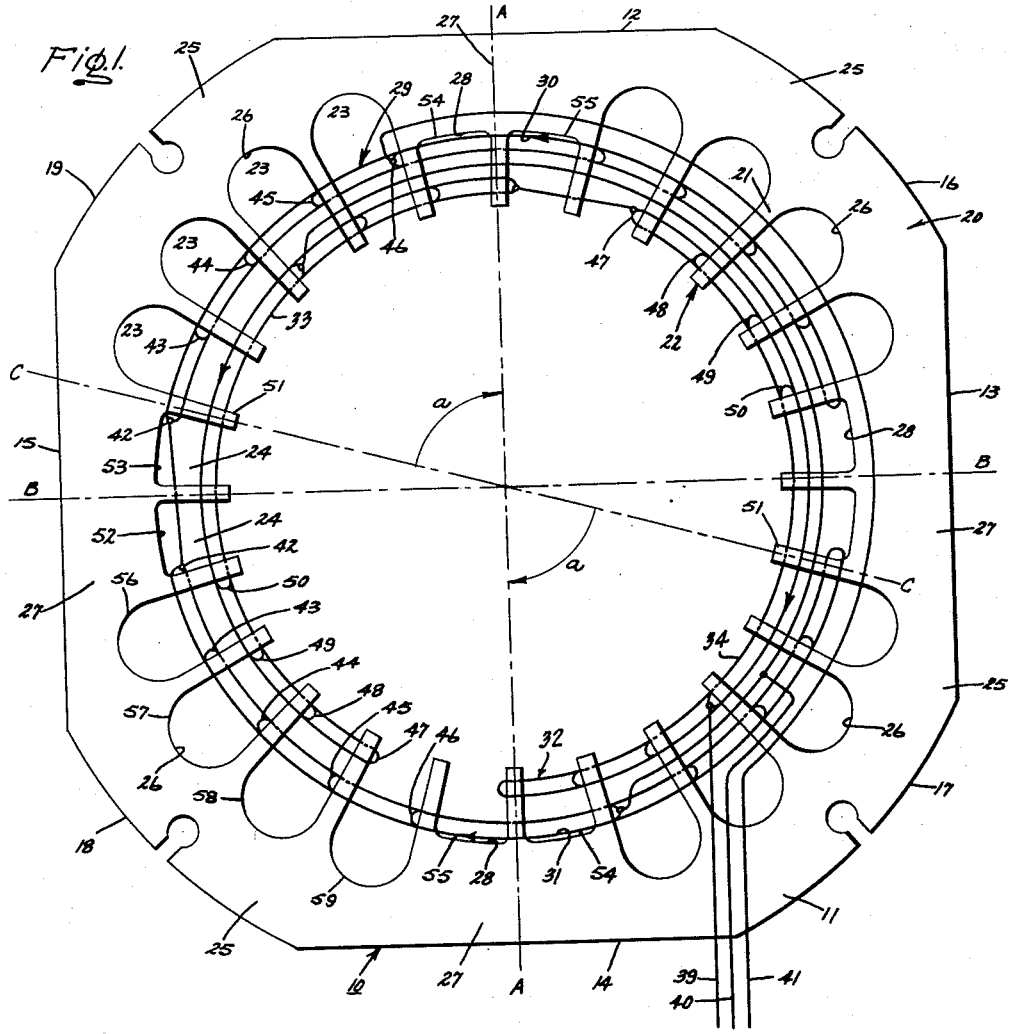

Nov. 6, 1962 C. A. SMITH 3,062,978

ELECTRIC MOTOR WINDING ARRANGEMENT

Filed Sept. 28, 1959

Inventor:
Chester A. Smith,
by H. F. Manbeck Jr.
Attorney.

3,062,978
ELECTRIC MOTOR WINDING ARRANGEMENT
Chester A. Smith, Holland, Mich., assignor to General
Electric Company, a corporation of New York
Filed Sept. 28, 1959, Ser. No. 842,934
5 Claims. (Cl. 310—166)

This invention relates to electric motors, and more particularly, to electric motors of the single phase induction type having distributed two pole main and starting windings positioned on the stator member.

Single phase induction type electric motors normally include primary and secondary members with the primary or stator carrying a main winding and suitable starting means such as a start winding and the secondary member or rotor being rotatably supported concentrically within the stator for relative rotation therewith. While the cross section of the stator member bore must, of course, be circular, it is becoming increasingly common to provide the outer periphery of the stator core with a substantially square cross section. A square type stator core is extremely desirable, for its shape makes it inherently versatile and usable for any number of applications, e.g. business machines where rods or the like cause interference with a circular type stator. Further, the square construction achieves savings both as to the amount of room taken up by the motor and as to the amount of magnetic material required in the making of the stator. Such a stator member thus presents a square outer configuration and a circular centrally located bore (generally cylindrical), with winding slots extending radially outwardly from the bore.

If all the winding slots were of the same depth, the yoke width between the bottom of each slot and the outer peripheral edge of the stator core would be greatly decreased near the center of each side of the square stator. Since a yoke section must be provided with an adequate area for a satisfactory flux distribution path, it is necessary to shorten the slots near the center of each side of the square stator. Due to the physical shape of the square stator having the smaller slots arranged adjacent each of the stator sides, it is usually true that the number of poles is equal to the number of stator sides and, therefore, the stator, is usually suitable only for sinusoidal windings of a four pole motor. However, as disclosed and claimed in my Patent 2,812,459, it is possible to utilize successfully the highly advantageous square type stator core construction in a two pole motor by placing each main winding pole substantially across diametrically opposite corners so that the outermost coils, which usually consist of a large number of wire turns, are disposed in the larger slots located at the other two corners. This arrangement provides a highly effective utilization of the main winding where the slot space consideration for the starting winding is not of primary importance.

However, certain situations require the largest start wire possible for any given two-pole induction motor size, e.g. where both the starting and main windings are energized during running conditions to provide improved running performance for higher horsepower rated motors. Thus, the slot area available for the coils of the starting winding becomes a critical factor in motor design. This is especially true where it is essential to maintain the highest level of operating efficiency for a two-pole induction motor having the smallest possible stator core stack size. Another factor which complicates the problem is the fact that in many motor applications; e.g. hermetically sealed refrigerator units, it is a requirement that the running current supplied to the starting winding must be maintained below a prescribed low value during motor operation.

Accordingly, it is a primary object of this invention to provide an improved two pole induction type motor having a square stator core with a high level of operating efficiency when both the starting and main windings are energized during running conditions of the motor.

It is another object of the invention to provide an improved winding arrangement for a two-pole induction type motor having a square stator core with the largest possible starting winding for any given stator core stack size, yet keeping the starting winding current at a minimum and acceptable value.

In carrying out the objects of the invention in one form thereof, I provide a square stator core member having a plurality of equally spaced slots with a two pole distributed main and starting windings. The stator member is formed with at least one shallow slot of decreased area relative to the other slots positioned substantially centrally on each stator side. The main winding is distributed in the slots with the outermost coil of each of its poles arranged in the shallow slots positioned in the diametrically opposite stator sides and the starting winding is arranged with its poles displaced from the main winding at a position in the slots other than 90 electrical degrees, more specifically, preferably not substantially in excess of 75 electrical degrees.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

Figure 2:
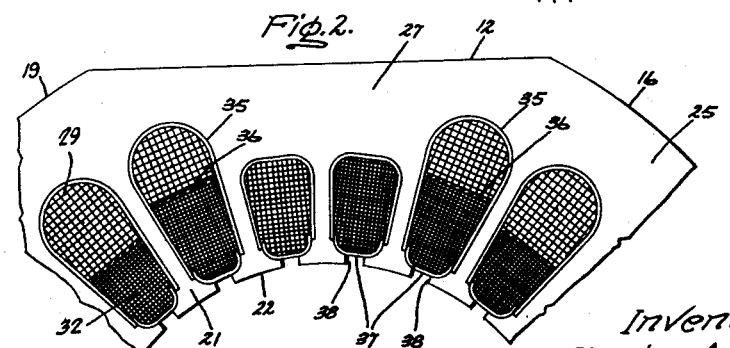

In the drawing:

FIG. 1 is an end view of a square stator member provided with one form of the improved winding arrangement of the present invention; and FIG. 2 is a fragmentary view of a portion of the stator member of FIG. 1, illustrating the distribution of the windings in the slots.

Referring now to the figures of the drawing, there is shown a stator member 10 of the single phase alternating current induction type electric motor (not shown). As illustrated, stator member 10 is formed with a laminated core 11 having a substantially square outer peripheral contour defined by four straight sides 12, 13, 14 and 15. In order to save both space and material, the corners 16, 17, 18 and 19 of core 11 are shown as being arcuate shaped; however, it should be apparent to those skilled in the art that the term "square," as used in this specification, is not limited to the specific stator core member illustrated by the figures, but refers to any stator core member having four substantially equal sides. The square stator core 11 comprises a main or yoke section 20 and a plurality of teeth 21 which extend radially inward to form a circular or cylindrical rotor receiving bore 22. In addition, teeth 21 form between them a plurality of equally spaced coil winding slots of two types, generally indicated by numerals 23 and 24 respectively.

Slots 23, as illustrated, are arranged in groups of four in the vicinity of each corner of core 11 where the radial distance between bore 22 and the outer peripheral surface of the core is large enough to permit the use of relatively deep slots having large winding receiving areas.

Even with the use of relatively large slots 23, a yoke portion 25, as defined by that part of the bore 11 located between the bottom 26 of the slots 23 and the outer surface of the core, can be provided with the necessary area for satisfactory flux distribution. However, in order to preserve an adequate yoke portion on the sides of core 11, indicated at 27 between the bottom 28 of slots 24 and the outer peripheral surface of the respective core sides, it is necessary to provide each of the slots 24, shown as arranged in pairs, with a decreased radial depth and consequently a decreased winding receiving area, as compared with the larger slots 23. Thus, it can be seen from an inspection of FIG. 1 that the substantially square stator member described above is geometrically symmetrical along a central line or vertical axis A—A and a horizontal axis B—B (as viewed in the drawing) with a shallow slot 24 being located adjacent each axis.

A main or running winding 29, wound with a plurality of turns of enameled wire and formed into two distributed poles 30 and 31, is arranged in the bottom of the large slots 23 of core 11. A starting winding 32, wound with a plurality of turns of enameled wire somewhat smaller in diameter than the main winding wire, is also formed into two distributed poles 33 and 34 which are disposed in the winding slots, adjacent the rotor receiving bore 22. The precise winding distribution of the main and starting winding poles will be further described and explained hereinafter.

Each slot is provided with a conventional slot liner 35 (see FIG. 2) and in those slots which carry both windings 29 and 32, the respective winding poles are electrically insulated one from the other by insulating means 36, interposed therebetween in the usual manner. Insulation wedges 37 are provided in the standard way in each slot opening 38, adjacent the bore 22, to close the entrance of the slots and to hold the windings therein.

It will be understood that a standard motor circuit familiar to those skilled in the art is contemplated and, therefore, the circuitry of the motor is neither illustrated nor described other than to explain that the windings are adapted to be connected across a suitable source of power by means, such as conductors 39, 40 and 41 shown in FIG. 1. Conductor 40 is the common lead, while conductors 39 and 41 are connected to the starting and main windings 32 and 29 respectively.

In the preferred form of my invention, main winding poles 30 and 31 are each formed of five concentric coils 42, 43, 44, 45 and 46, the corresponding coils of each pole being identically distributed in diametrically opposite slots. Since it is desirable for optimum motor performance to achieve as close to a sinusoidal wave form for the flux distribution in each winding pole as is practically possible, there is a different number of wire turns for each coil. While the precise relationship of the number of wire turns for each coil differs with the size and type of motor, it is consistently necessary to include more wire turns in the outer coils than in the inner coils.

This same general situation holds true for the starting winding 32, and as shown, starting winding poles 33 and 34 are each provided with four concentric coils 47, 48, 49 and 50, each coil having a different number of wire turns with the greater number of turns being contained by the outer coils. As in the case of the main winding poles, starting winding poles 33 and 34 are disposed in exact diametrically opposite relationship on stator core 11.

It can be seen from an inspection of FIG. 1 that main poles 30 and 31 are concentrically arranged about axis A—A of stator core 11 with the inner coils 46 being received in the larger slots 23 located adjacent the smaller slots 24. The outermost coil 42 of each pole is therefore received in the smaller slots 24 located adjacent horizontal axis B—B of stator core 11. The remaining coils of each main pole 30 and 31 are received in the larger slots 23 located in each of the stator core corners. With this arrangement, the main winding coils, which gradually decrease in number of turns from the outermost coils to the innermost coil adjacent axis A—A, allow a corresponding gradual increase in available slot area for the starting winding coils as axis A—A is approached.

In order to obtain a starting winding arrangement which will require a minimum amount of electric current for energizing the starting windings, yet will permit full utilization of the available slot area for the starting winding coils, I displace starting winding poles 33 and 34 at an angle other than 90 electrical and mechanical degrees from the main winding 29. Since in two pole motors electrical degrees are numerically equal to mechanical degrees, starting winding 32 will be physically displaced from the main winding 29 an amount equal to angle $a$ (FIG. 1) as measured from line C—C, the axis around which the starting winding coils are concentrically distributed. In the illustrated embodiment, the angle of displacement is approximately 75°, each starting winding pole being concentrically arranged around a stator core tooth, 51 which divides one of the larger slots 23 having main winding coil 43 disposed therein and one of the smaller slots 24 carrying the outermost main winding coil 42.

It will be observed that with this arrangement, generally speaking, each of the larger slots 23 will hold a combination of main winding coils and starting winding coils such that, as the main winding coils gradually decrease in number of turns thereby taking up less slot area, there will be a progressive increase in number of starting winding wire turns to fill the available space. Moreover, as seen in FIG. 1, the smaller slots 24 located adjacent axis B—B and further identified by numerals 52 and 53 will each carry only one coil outermost main coil 42, while the smaller slots 24 indicated as slots 54 and 55 provided next to axis A—A, will each carry only one of the starting winding outer coils (47 or 48) which is composed of the most number of wire turns. Taking the four larger slots 23 provided near the stator core corner 18, for example, and further identifying them in FIG. 1 by numerals 56, 57, 58 and 59, it will be observed that larger slot 56 carries the second most outer main winding coil 43 composed of a large number of wire turns. There is thus permitted comparatively little slot area for holding the inner starting winding coil 50. However, as mentioned heretofore, it is desirable for optimum motor performance to have each coil of the starting winding formed with a different number of wire turns with the greater number of turns being contained by the outer coils and the lesser number contained by the inner coils. Therefore, slot 56 provides sufficient area for carrying the inner starting winding coil 50 which has the least number of wire turns. Similarly, larger slots 57, 58, and 59 carry the main winding coils 44, 45 and 46 respectively which progressively take up less slot area, allowing a corresponding increase in available area for carrying coils 49, 48, and 47 of the starting winding which must progressively increase in the number of wire turns.

The following example is given in order to illustrate more clearly how the invention, as described above, has been carried forth in actual practice. A stator core having the following dimensions was used:

Rotor receiving bore diameter _____ 2.6515/2.6485
Stator outer peripheral diameter
  (corner to corner) _____ 5.480/5.478
Stator outer peripheral diameter
  (side to side) _____ 4.80

The main coils for each main pole were wound in accordance with the winding distribution outlined above with .0385 inch in diameter enamel coated wire, a standard size wire for small motors. A substantially sinusoidal flux wave form was approximated by the use of the following coil distribution:

| Main Coil | No. of turns | Total Wire Cross Section (area in circular mils) |
|---|---|---|
| Coil 42 (outermost coil) | 44 | 65,210 |
| Coil 43 | 44 | 65,210 |
| Coil 44 | 43 | 63,730 |
| Coil 45 | 38 | 56,320 |
| Coil 46 (innermost coil) | 28 | 41,500 |

The following coil distribution was provided for the starting winding having a coated wire diameter of .0222 inch:

| Starting Coil | No. of turns | Total Wire Cross Section (area in circular mils) |
|---|---|---|
| Coil 47 (outermost coil) | 83 | 40,900 |
| Coil 48 | 54 | 26,610 |
| Coil 49 | 39 | 19,220 |
| Coil 50 (innermost coil) | 35 | 17,250 |

When the main and starting windings of the example were arranged on the square type stator core in accordance with the present invention, the individual coils were distributed in the stator slots in the following manner:

| | Starting Coils (wire cross section area in circular mils) | Main Coils (wire cross section area in circular mils) | Total Wire Area Utilized (in circular mils) |
|---|---|---|---|
| Large Slots 23 (slot number): | | | |
| 59 | 47—40,900 | 46—41,500 | 82,400 |
| 58 | 48—26,610 | 45—56,320 | 82,930 |
| 57 | 49—19,220 | 44—63,730 | 82,950 |
| 56 | 50—17,250 | 43—65,210 | 82,460 |
| Small Slots 24: | | | |
| 55 | 47—40,900 | none | 40,900 |
| 54 | 48—26,610 | none | 26,610 |
| 53 | none | 42—65,210 | 65,210 |

Thus it will be appreciated from the foregoing example that even though the highly desirable square stator core is used with its inherent limitation on available slot area for two pole winding distribution, the present invention provides a winding arrangement which not only allows adequate main winding slot receiving area, but also provides a most effective and advantageous slot utilization for the starting winding. For instance, it will be observed from the above example that, although the outermost coil of the main winding which requires the most number of wire turns is positioned in the shallow slots, each shallow slot accommodates only one coil. In addition, an inspection of the "Total Wire Area Utilized" column in the given example for the large slots 56–59 inclusive, each slot having the same available coil receiving area, clearly indicates the completeness and effectiveness in which the individual slot areas are used; i.e., the combined area of the main and starting coils for these slots varies in circular mils from a minimum of 82,400 to a maximum of 82,950, a mere variation of 550 circular mils.

It will also be seen that the starting winding poles being positioned in the slots displaced from the main winding poles at an angle other than 90 electrical degrees, there is permitted a winding distribution in which the number of turns for both the main and starting winding coils, in effect, progressively increase from the innermost to the outermost coil in a most efficient and effective manner thereby producing a flux wave form substantially sinusoidal in shape when both windings are energized during running conditions. Further and equally as important, this arrangement provides for a decrease in the electrical current necessary to energize the starting winding 32, and this is true even in spite of the fact that, due to the novel distribution of the various coils, more starting winding wire can be used for any given square two pole stator stack size than has been heretofore possible.

Therefore, I have provided an improved winding arrangement which permits the use of the highly desirable square stator core, and yet I have obtained a high level of operating efficiency when both the starting and main windings are energized during motor operation at a minimum of expense.

While this invention has been explained by describing the particular embodiment thereof, it will be apparent that improvements and modifications may be made without departing from the true scope and spirit of the invention as defined in the appended claims.

What I claim as new and desire to secure by Letters Patent of the United States is:

1. A two pole single phase alternating current induction type electric motor including a stator member having a plurality of substantially angularly spaced apart slots formed therein and having a substantially square peripheral surface, at least one shallow slot of decreased area relative to the other slots positioned substantially at the center of each side of said member to maintain a yoke section of adequate width in said stator member, and two pole distributed main and starting windings having coils arranged in said slots, said main winding having the outermost coil of each pole arranged in the shallow slots provided in a pair of diametrically opposite sides of said stator member, the angle of displacement in said slots between each starting winding pole and one of the adjacent main winding poles being not substantially beyond 75 degrees.

2. A two pole single phase alternating current induction type electric motor including a stator member having a plurality of substantially angularly spaced apart slots formed therein and having a substantially square peripheral surface, at least one shallow slot of decreased area relative to the other slots positioned substantially at the center of each side of said member to maintain a yoke section of adequate width in said stator member, and two pole distributed main and starting windings having coils arranged in said slots, said main winding having the outermost coil of each pole arranged in the shallow slots provided in one pair of diametrically opposite sides of said stator member, one side of the outermost coil of each starting winding pole disposed in the shallow slots positioned at the other pair of diametrically opposite sides of said stator member the angle of displacement between each starting winding pole and one of the adjacent main winding poles in said slots not substantially exceeding 75 degrees.

3. A two pole single phase alternating current induction type electric motor including a stator member having a plurality of substantially equally spaced slots formed therein and having a substantially square peripheral surface, at least two shallow slots of decreased area relative to the other slots positioned substantially adjacent the center of each side of said member to maintain a yoke section of adequate width in said stator member, and two pole distributed main and starting windings having coils arranged in said slots, said starting winding having one side of the outermost coil of each pole arranged in the shallow slots provided in one pair of diametrically opposite sides of said stator member and having each of its poles displaced in said slots from one of the adjacent main winding poles by an angle of approximately 75 degrees, the number of turns in the outermost coils of each winding pole being greater in number than the turns of the innermost coils of the same pole to produce an approximate flux sine wave for each winding upon energization thereof both of said windings being arranged to be energized during starting and running conditions.

4. A two pole single phase alternating current induction type electric motor including a stator member having a plurality of substantially equally spaced slots formed therein and having a substantially square peripheral surface, at least one shallow slot of decreased area relative to the other slots positioned substantially adjacent the center of each side of said member to maintain a yoke section of adequate width in said stator member, and two pole distributed main and starting windings arranged in said slots, said main winding having the outermost coil of each pole arranged in the shallow slots provided in one pair of diametrically opposite sides of said stator member, the angle of displacement in said slots between the center of each starting winding pole and the center of one of the adjacent main winding poles generally being 75 degrees, one side of the outermost coil of each starting winding pole disposed in the shallow slots positioned at the other diametrically opposite sides of said stator member, the number of turns in the outermost coil of each pole being greater in number than the number of turns in the innermost coil of the same pole to produce an approximate flux sine wave for each winding upon energization thereof both of said windings being arranged to be energized during starting and running conditions.

5. A two pole single phase alternating current induction type electric motor including a stator member formed with a generally square outer periphery and with a central rotor receiving bore, a plurality of substantially equally spaced apart slots disposed angularly around the bore in said member defining a yoke section radially beyond the slots, each corner of the core formed with a group of four slots and each core side having two slots of smaller area than said corner slots, a main and auxiliary winding disposed in said slots for two pole operation and both arranged to be energized during starting and running conditions, each main winding pole defined by five concentrically arranged coils composed of a number of turns of wire with the outermost coil of each main winding pole positioned in adjacent smaller slots provided in one pair of diametrically opposite sides of the stator, the center of each auxiliary winding pole being spaced from the center of one of the adjacent main winding poles by an angle of substantially 75 degrees, each auxiliary winding pole being defined by four concentric coils composed of a number of turns of wire, with one side of the outermost coil of one auxiliary winding pole being disposed in the smaller slot in diametrically opposed relation to the one side of the outermost coil of the other auxiliary winding pole, the outermost coil of each pole including a greater number of wire turns than the innermost coil of the same pole to produce an approximate flux sine wave for each winding, said smaller slots carrying coils solely of one or the other winding.

References Cited in the file of this patent
UNITED STATES PATENTS

| | | |
|---|---|---|
| 2,267,414 | Morrill | Dec. 23, 1941 |
| 2,448,785 | Dolan | Sept. 7, 1948 |
| 2,795,712 | Suhr | June 11, 1957 |

FOREIGN PATENTS

| | | |
|---|---|---|
| 747,346 | Great Britain | Apr. 4, 1956 |